United States Patent
Konagolli Suresh et al.

(10) Patent No.: US 9,128,974 B2
(45) Date of Patent: Sep. 8, 2015

(54) METHODS FOR TRACKING DATABASE CHANGES AND DEVICES THEREOF

(75) Inventors: Ananth Prasad Konagolli Suresh, Bangalore (IN); Vikrant Raghu, Chennai (IN); Renji Kuruvilla Thomas, Cochin (IN)

(73) Assignee: Infosys Limited, Bangalore (IN)

( * ) Notice: Subject to any disclaimer, the term of this patent is extended or adjusted under 35 U.S.C. 154(b) by 529 days.

(21) Appl. No.: 13/542,792

(22) Filed: Jul. 6, 2012

(65) Prior Publication Data

US 2013/0024422 A1 Jan. 24, 2013

(30) Foreign Application Priority Data

Jul. 19, 2011 (IN) .......................... 2450/CHE/2011

(51) Int. Cl.
- G06F 17/00 (2006.01)
- G06F 7/00 (2006.01)
- G06F 17/30 (2006.01)

(52) U.S. Cl.
CPC .... G06F 17/30368 (2013.01); G06F 17/30578 (2013.01); G06F 17/30309 (2013.01); G06F 17/30575 (2013.01); G06F 17/30581 (2013.01)

(58) Field of Classification Search
None
See application file for complete search history.

(56) References Cited

U.S. PATENT DOCUMENTS

| | | | |
|---|---|---|---|
| 2004/0022379 A1* | 2/2004 | Klos et al. | 379/201.01 |
| 2004/0199552 A1* | 10/2004 | Ward et al. | 707/204 |
| 2005/0027725 A1* | 2/2005 | Kagalwala et al. | 707/100 |
| 2007/0121850 A1* | 5/2007 | Klos et al. | 379/114.28 |
| 2008/0222159 A1* | 9/2008 | Aranha et al. | 707/10 |
| 2012/0023077 A1* | 1/2012 | Kann et al. | 707/702 |
| 2012/0078917 A1* | 3/2012 | Gradin et al. | 707/748 |
| 2012/0086544 A1* | 4/2012 | Kemp | 340/5.1 |

* cited by examiner

*Primary Examiner* — Dung K Chau

(74) *Attorney, Agent, or Firm* — LeClairRyan, a Professional Corporation

(57) ABSTRACT

Methods, devices, and computer-readable storage media for tracking changes in a database including at least one database table include adding a first column to a schema of each database table. The first column includes a row update identifier for each row of the database table. A global update identifier is incremented in response to a row change and recorded as the row update identifier for the changed row. In response to a latest database synchronization event, a reference table including a synchronization update identifier is generated, and the global update identifier is incremented and recorded as the synchronization update identifier. An update to a row in a database table is tracked based at least upon determining that a row update identifier of the updated row in the database table is greater than the synchronization update identifier in the reference table.

24 Claims, 2 Drawing Sheets

METHODS FOR TRACKING DATABASE CHANGES AND DEVICES THEREOF

This application claims the benefit of Indian Patent Application Filing No. 2450/CHE/2011, filed Jul. 19, 2011, which is hereby incorporated by reference in its entirety.

FIELD

This technology generally relates to methods for tracking database changes and, more particularly, relates to methods for tracking changes in mobile databases and devices thereof.

BACKGROUND

A database trigger is procedural code that may be utilized to track changes within a database. However, database triggers are not supported by a majority of mobile databases in the market. Thus, mobile applications utilizing mobile databases such as Microsoft SQL CE and Oracle Database Lite are limited in that the onus of tracking changes lies with the mobile application. All data changes must, therefore, be maintained in memory. As mobile devices are inherently memory constrained, this limitation can result in burdensome overhead requirements.

SUMMARY

An exemplary method for tracking changes in a database including at least one database table includes adding, by a database change tracking computing device, a first column to a schema of each database table. The first column includes a row update identifier for each row of the database table. A global update identifier is incremented in response to a row change. The incremented value of the global update identifier is recorded as the row update identifier for the changed row in response to the row change. In response to a latest database synchronization event, a reference table including a synchronization update identifier is generated by the database change tracking computing device. The global update identifier is incremented in response to the latest synchronization event. The incremented value of the global update identifier is recorded as the synchronization update identifier in response to the latest synchronization event. An update to a row in a database table is tracked by the database change tracking computing device based at least upon determining that a row update identifier of the updated row in the database table is greater than the synchronization update identifier in the reference table. The database change tracking computing device provides at least a portion of the changed database.

An exemplary computer-readable storage medium having stored thereon instructions for tracking changes in a database including at least one database table. The instructions include machine executable code which, when executed by at least one processor, causes the processor to perform steps including adding a first column to a schema of each database table. The first column includes a row update identifier for each row of the database table. A global update identifier is incremented in response to a row change. The incremented value of the global update identifier is recorded as the row update identifier for the changed row in response to the row change. In response to a latest database synchronization event, a reference table including a synchronization update identifier is generated. The global update identifier is incremented in response to the latest synchronization event. The incremented value of the global update identifier is recorded as the synchronization update identifier in response to the latest synchronization event. An update to a row in a database table is tracked based at least upon determining that a row update identifier of the updated row in the database table is greater than the synchronization update identifier in the reference table. At least a portion of the changed database is provided.

An exemplary database change tracking computing device for tracking changes in a database including at least one database table, the device including one or more processors and a memory coupled to the one or more processors which are configured to execute programmed instructions stored in the memory, the programmed instructions including adding a first column to a schema of each database table. The first column includes a row update identifier for each row of the database table. A global update identifier is incremented in response to a row change. The incremented value of the global update identifier is recorded as the row update identifier for the changed row in response to the row change. In response to a latest database synchronization event, a reference table including a synchronization update identifier is generated. The global update identifier is incremented in response to the latest synchronization event. The incremented value of the global update identifier is recorded as the synchronization update identifier in response to the latest synchronization event. An update to a row in a database table is tracked based at least upon determining that a row update identifier of the updated row in the database table is greater than the synchronization update identifier in the reference table. At least a portion of the changed database is provided.

This technology provides effective and efficient methods and devices for tracking and retrieving database changes. Additionally, this technology provides a methodology by which database changes can be tracked and retrieved in the absence of database triggers. Beneficially, memory constrained devices, such as mobile devices, can quickly and reliably track and retrieve database changes without undue burden on the mobile device storage.

DETAILED DESCRIPTION

This technology is directed to methods, systems, and computer-readable storage media for tracking changes in a database. Such database change tracking techniques may include, for example, schema modification on the database.

Figure 1:
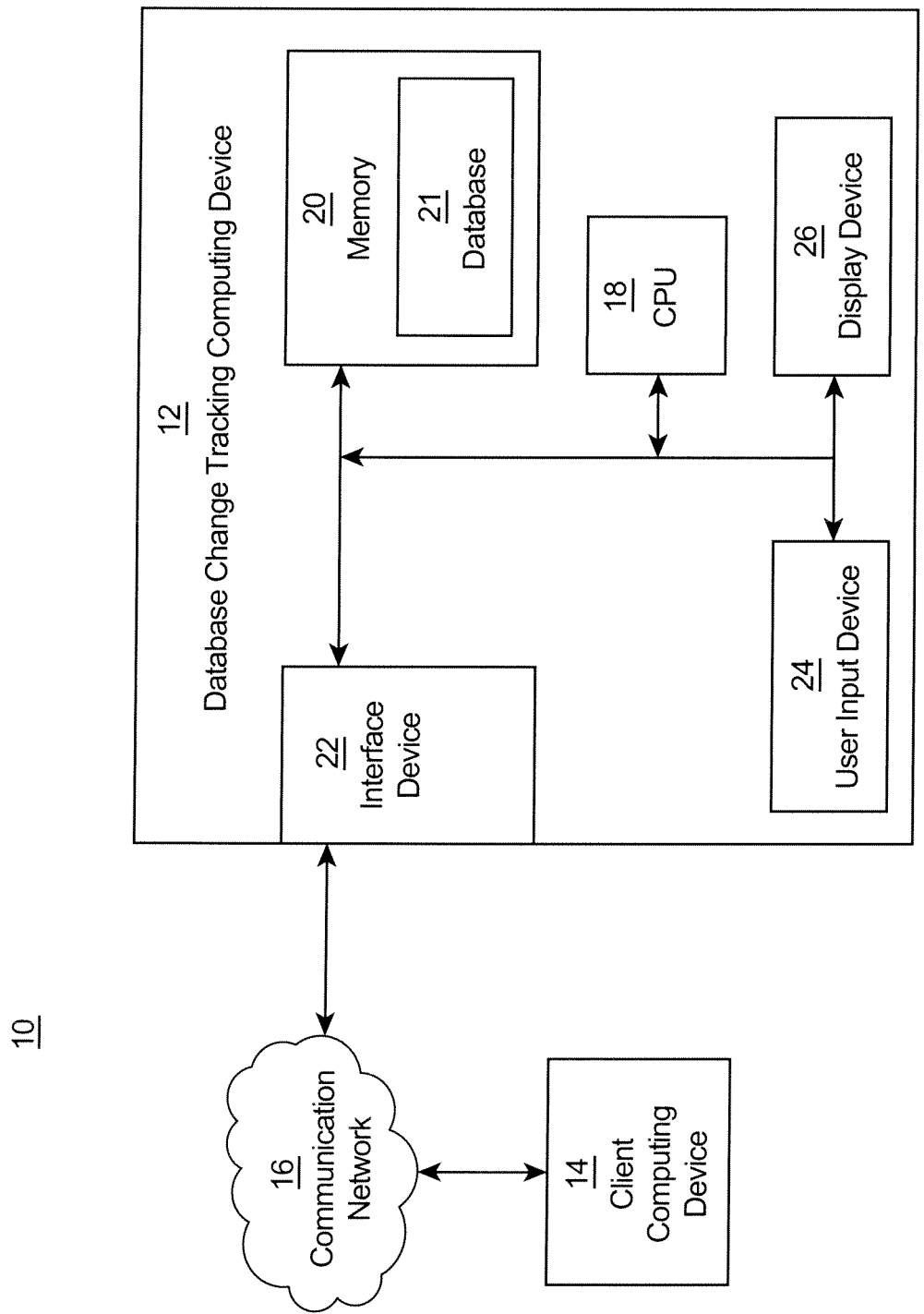
FIG. 1 is a block diagram of an environment with an exemplary database change tracking computing device.

Referring more specifically to FIG. 1, an environment 10 with an exemplary database change tracking computing device 12 is illustrated. The environment 10 includes the database change tracking computing device 12 and one or more client computing devices 14 which are all coupled together by one or more communication networks 16, although this environment can include other numbers and types of systems, devices, components, and elements in other configurations. This technology provides a number of advantages including providing more effective and efficient methods and devices for tracking and retrieving database changes. Additionally, this technology provides a methodology by which database changes can be tracked and retrieved in the absence of database triggers.

In this example, the database change tracking computing device 12 adds a first column to a schema of each database table in database 21. The first column includes a row update identifier for each row of the database table. A global update identifier is incremented in response to a row change. The incremented value of the global update identifier is recorded as the row update identifier for the changed row in response to the row change. In response to a latest database synchronization event, the database change tracking computing device 12 generates a reference table including a synchronization update identifier. The global update identifier is incremented in response to the latest synchronization event. The incremented value of the global update identifier is recorded as the synchronization update identifier in response to the latest synchronization event. The database change tracking computing device 12 tracks an update to a row in a database table based at least upon determining that a row update identifier of the updated row in the database table is greater than the synchronization update identifier in the reference table. The database change tracking computing device 12 provides at least a portion of the changed database 21. The database change tracking computing device 12 may, however, perform other numbers and types of functions.

The database change tracking computing device 12 includes a central processing unit (CPU) or processor 18, a memory 20 with a database 21, an interface device 22, a user input device 24, and a display device 26 which are coupled together by a bus or other link, although other numbers and types of systems, devices, components, and elements in other configurations and locations can be used. The processor 18 in the database change tracking computing device 12 executes a program of stored instructions for one or more aspects of the present technology as described and illustrated by way of the examples herein, although other types and numbers of processing devices and logic could be used and the processor could execute other numbers and types of programmed instructions.

The memory 20 in the database change tracking computing device 12 stores these programmed instructions for one or more aspects of the present technology as described and illustrated herein, although some or all of the programmed instructions could be stored and executed elsewhere. In this example, the memory 20 includes the database 21 which may be a Microsoft SQL CE or an Oracle Lite database, although other types and numbers of databases which are stored at other locations could be used. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18 in the database change tracking computing device 12, can be used for the memory 20 in the database change tracking computing device 12.

The interface device 22 in the database change tracking computing device 12 may be used to operatively couple and communicate between the database change tracking computing device 12 and the one or more client computing devices 14 via one or more of the communications networks 16, although other types and numbers of communication networks or systems with other types and numbers of connections and configurations can be used. By way of example only, the one or more communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

The user input device 24 in the database change tracking computing device 12 may include a haptic touchscreen interface, and/or a computer keyboard and a computer mouse, although other types and numbers of user input devices can be used. In this example, the user input device 24 in the database change tracking computing device 12 may be used to input insertions, updates, and/or deletions to database 21, although other types of data and information could be entered in other manners.

The display device 26 in the database change tracking computing device 12 includes a computer display screen, such as a CRT or LCD screen, although other types and numbers of displays could be used. In this example, the display device 26 in the database change tracking computing device 12 may be used to display portions of database 21, although other types of data and information and other types of graphical user interfaces could be displayed.

Each of the one or more client computing devices 14 includes a central processing unit (CPU) or processor, a memory, an interface device, a user input device, and a display which are coupled together by a bus or other link, although each could comprise other numbers and types of devices, elements, and components in other configurations. Each of the one or more client computing devices 14 may be remotely located from the database change tracking computing device 12, although other configurations could be used. The processor in each of the one or more client computing devices 14 can execute a non-transitory program of stored instructions for one or more aspects of the present technology as described and illustrated by way of the examples herein, although other types and numbers of processing devices and logic could be used and the processor could execute other numbers and types of programmed instructions. The display of each of the one or more client computing devices 14 may be used to display a user based interface (e.g., an interface to database 21) with one or more form fields. The user input device of each of the one or more client computing devices 14 may be used to input data in the form fields of the user based interfaces which are configured to directly provide the data to the database change tracking computing device 12 for tracking and retrieving changes in database 21, although other types and numbers of functions could be performed. Although one client computing device 14 is shown, other numbers of client computing devices and other types and numbers of systems and devices which can display and provide interaction with the user based interface can be used.

Although examples of the database change tracking computing device 12 and the one or more client computing devices 14 are described herein, each of these systems can be implemented on any suitable computer system or computing device (e.g., mobile or otherwise). It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on a computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

The present disclosure involves providing more effective and efficient methods and devices for tracking and retrieving database changes. This technology provides a methodology by which database changes can be tracked and retrieved in the absence of database triggers. Beneficially, memory constrained devices, such as mobile devices, can quickly and reliably track and retrieve database changes without undue burden on the mobile device storage.

Figure 2:
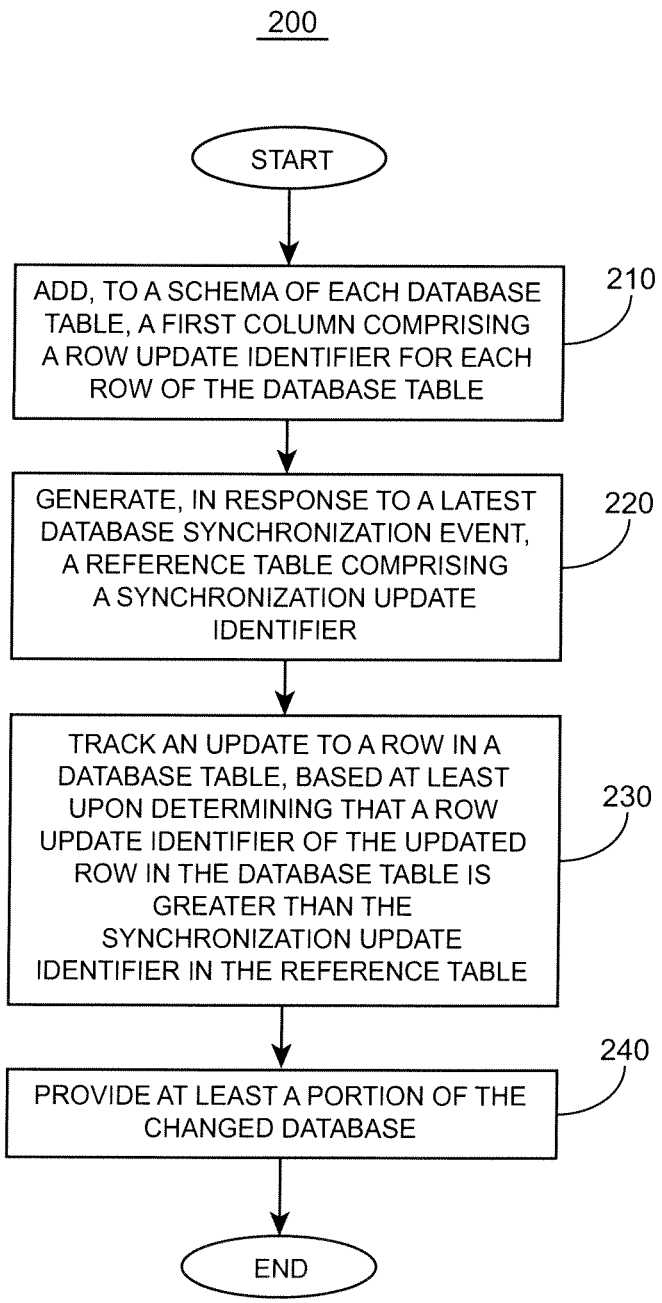
FIG. 2 is a flowchart of an exemplary method for tracking changes in a database.

An exemplary method 200 for tracking changes in a database will now be described with reference to FIGS. 1 and 2. In step 210, the database change tracking computing device 12 adds a first column to a schema of each database table in database 21, although other types and numbers of additions to the schema of the database table could be used. In this example, the first column includes a row update identifier for each row of the database table and a global update identifier is incremented in response to a row change, although other types and numbers of identifiers can be updated or added. The incremented value of the global update identifier is recorded as the row update identifier for the changed row in response to the row change.

In step 220, the database change tracking computing device 12, in response to a latest database synchronization event, generates a reference table including a synchronization update identifier. The global update identifier is incremented in response to the latest synchronization event. The incremented value of the global update identifier is recorded as the synchronization update identifier in response to the latest synchronization event.

In step 230, the database change tracking computing device 12 tracks an update to a row in a database table based at least upon determining that a row update identifier of the updated row in the database table is greater than the synchronization update identifier in the reference table.

In step 240, the database change tracking computing device 12 provides at least a portion of the changed database 21 (e.g., via display device 26), although the database can be utilized in other manners, such as by storing the changed database for utilization with subsequent operations.

EXAMPLES

Set forth below in Table 1, an exemplary database table including employee identification numbers and names is shown. In accordance with step 210, a column labeled "Row Update Identifier" is added to the schema. Here, the row update identifiers indicate that the last update to row 1 corresponds to a global update identifier value of "1," while the last update to row 4 corresponds to a later global update identifier value of "21."

TABLE 1

Exemplary Database Table

| Employee ID | Employee Name | Row Update Identifier | Row Creation Timestamp | Unique Identifier |
|---|---|---|---|---|
| 1 | Ananth | <0000000000000001> | 1/27/2009 11:15:35 AM | b2eb8428-aa6a-42d2-9946-7c409e3fecbd |
| 2 | Vikrant | <0000000000000002> | 1/27/2009 11:16:51 AM | 5a91ff2c-9b93-4095-a3ec-a2ecbda151d6 |
| 3 | Renji | <0000000000000023> | 1/27/2009 11:16:54 AM | 098813c8-580d-487a-8b4b-2f7414707d1f |
| 4 | Seema | <0000000000000021> | 1/27/2009 11:21:35 AM | dc9e7076-1f2e-42a7-9f5b-720aadebb979 |

Table 2 depicts an exemplary reference table in which includes a synchronization update identifier corresponding to a global update identifier value of "20." This indicates to database change tracking computing device 12 that the most recent synchronization update occurred prior to updates having been made to both rows 3 and 4 of the database table in Table 1, since both rows 3 and 4 have row update identifiers "21" and "23" respectively which are both greater than the synchronization update identifier value of "20." In this way, database change tracking computing device 12 may track, retrieve, and provide these updates occurring in rows 3 and 4 of an exemplary database table within database 21.

TABLE 2

Exemplary Reference Table

| Synchronization Timestamp | Synchronization Update Identifier |
|---|---|
| 1/27/2009 11:20:01 AM | <00000000000000020> |

In some embodiments, the reference table may further include a synchronization timestamp recording a date and time the latest database synchronization event occurred. Additionally, database change tracking computing device 12 may add a second column to the schema of each database table in database 21. The second column may include a row creation timestamp for each row of the database table such that the row creation timestamp records a date and time the corresponding row was created. In this way, the database change tracking computing device 12 may track an insertion of a row in a database table by comparing a row creation timestamp of the inserted row in the database table with the synchronization timestamp in the reference table. That is, a row update may be distinguished as either a row insertion or an alteration to an already existing row.

For example, referring back to Tables 1 and 2, based on comparing the synchronization update identifier in the reference table to the row update identifiers of the database table, the database change tracking computing device 12 determined that updates occurred in rows 3 and 4. However, by alternatively or additionally comparing the row creation timestamp corresponding to each of rows 3 and 4 with the synchronization timestamp in the reference table, the database change tracking computing device 12 may further determine that, at the time of the last synchronization, row 3 was an already existing row that has since been altered in some way. That is, because the row creation timestamp of row 3 indicates a time earlier than that of the synchronization timestamp, row 3 was already in existence at the time of the last synchronization. On the other hand, database change tracking computing device 12 may determine that updated row 4 was in fact newly created and thus inserted after the last synchronization because the row creation timestamp of row 4 indicates a time later than that of the synchronization timestamp. In this way, database change tracking computing device 12 may track, retrieve, and provide these types of row insertions into an exemplary database table within database 21.

In some embodiments, the database change tracking computing device 12 may further add a third column to the schema of each database table in database 21. The third column may include a unique identifier for each row of the database table. The unique identifier may, for example, be generated by an existing function within the database application. However, the unique identifier may be generated by any suitable means. In response to the latest database synchronization event, the database change tracking computing device 12 may generate a lookup table including each unique identifier for each row of each database table. In some of these embodiments, generating may further include updating the lookup table. In this way, database change tracking computing device 12 may track a deletion of a row in a database table, based at least upon determining that the unique identifier of the deleted row in the lookup table is missing from the database table in database 21. In response to tracking the row deletion, the database change tracking computing device 12 may remove the unique identifier of the deleted row from the lookup table. In this way, database change tracking computing device 12 may track, retrieve, and provide these types of row deletions in an exemplary database table within database 21. Alternatively or additionally, in response to tracking a row insertion as described above, the database change tracking computing device 12 may enter the unique identifier of the inserted row into the lookup table.

For example, referring back to Table 1, database change tracking computing device 12 has assigned a unique identifier (UID) to each of rows 1-4 and altered the database schema accordingly. Table 3 depicts an exemplary lookup table corresponding to the database table of Table 1 and the reference table of Table 2. In particular, by comparing the UIDs in the lookup table with the UIDs database table in Table 1, the database change tracking computing device 12 may determine that the row corresponding to the UID "608085d6-ad2d-4d70-abee-6242af052507" has since been deleted, as that particular UID no longer appears in Table 1.

TABLE 3

Exemplary Lookup Table

| Table Name | Unique Identifier |
|---|---|
| Table1 | b2eb8428-aa6a-42d2-9946-7c409e3fecbd |
| Table1 | 5a91ff2c-9b93-4095-a3ec-a2ecbda151d6 |
| Table1 | 098813c8-580d-487a-8b4b-2f7414707d1f |
| Table1 | 608085d6-ad2d-4d70-abee-6242af052507 |

Upon tracking this deleted row, database change tracking computing device 12 may delete the corresponding row from the lookup table, as shown in Table 4.

TABLE 4

Exemplary Lookup Table After Tracking Row Deletion

| Table Name | Unique Identifier |
|---|---|
| Table1 | b2eb8428-aa6a-42d2-9946-7c409e3fecbd |
| Table1 | 5a91ff2c-9b93-4095-a3ec-a2ecbda151d6 |
| Table1 | 098813c8-580d-487a-8b4b-2f7414707d1f |

Furthermore, in response to tracking the insertion of row 4 into the database table of Table 1 as described above, the database change tracking computing device 12 may enter the UID of inserted row 4 into the lookup table, as shown in Table 5.

TABLE 5

Exemplary Lookup Table After Tracking Row Deletion and Row Insertion

| Table Name | Unique Identifier |
|---|---|
| Table1 | b2eb8428-aa6a-42d2-9946-7c409e3fecbd |
| Table1 | 5a91ff2c-9b93-4095-a3ec-a2ecbda151d6 |
| Table1 | 098813c8-580d-487a-8b4b-2f7414707d1f |
| Table1 | dc9e7076-1f2e-42a7-9f5b-720aadebb979 |

Although only one database table is depicted in the examples described above, it should be understand that the above-described methods may be similarly performed with respect to a plurality of database tables.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for tracking database changes, the method comprising:
adding, by a database change tracking computing device, to a schema of at least one table of a database, a first column comprising a row update identifier for at least one row of the database table, wherein a global update identifier is incremented in response to a change to the row and the incremented value of the global update identifier is recorded as the row update identifier for the row in response to the change;

generating, by the database change tracking computing device, in response to a latest database synchronization event, a reference table comprising a synchronization update identifier, wherein the global update identifier is incremented in response to the latest database synchronization event and the incremented value of the global update identifier is recorded as the synchronization update identifier in response to the latest database synchronization event;

tracking, by the database change tracking computing device, an update to the row, based at least upon determining that the row update identifier is greater than the synchronization update identifier in the reference table; and providing, by the database change tracking computing device, at least a portion of the database subsequent to the update.

2. The method of claim 1, wherein the reference table further comprises a synchronization timestamp recording a date and time the latest database synchronization event occurred.

3. The method of claim 2, the method further comprising:
adding, by the database change tracking computing device, to the schema of the database table, a second column comprising a row creation timestamp for the row of the database table, wherein the row creation timestamp records a date and time the row was created; and tracking, by the database change tracking computing device, an insertion of the row in the database table, based at least upon comparing the row creation timestamp of the row in the database table to the synchronization timestamp in the reference table.

4. The method of claim 3, the method further comprising:
adding, by the database change tracking computing device, to the schema of the database table, a third column comprising a unique identifier for the row of the database table;

generating, by the database change tracking computing device, in response to the latest database synchronization event, a lookup table comprising the unique identifier for the row of the database table; and tracking, by the database change tracking computing device, a deletion of the row in a database table, based at least upon determining that the unique identifier of the row in the lookup table is missing from the database table.

5. The method of claim 4, wherein the generating the lookup table comprises updating, by the database change tracking computing device, in response to the latest database synchronization event, the lookup table.

6. The method of claim 5, the method further comprising:
removing, by the database change tracking computing device, the unique identifier of the row from the lookup table in response to tracking the deletion.

7. The method of claim 6, the method further comprising:
entering, by the database change tracking computing device, the unique identifier of the row into the lookup table in response to tracking the insertion.

8. The method of claim 7, wherein the database is utilized on a mobile device.

9. A non-transitory computer-readable medium having stored thereon instructions for tracking database changes comprising executable code which, when executed by at least one processor, causes the processor to perform steps comprising:
adding to a schema of at least one table of a database, a first column comprising a row update identifier for at least one row of the database table, wherein a global update identifier is incremented in response to a change to the row and the incremented value of the global update identifier is recorded as the row update identifier for the row in response to the change;

generating in response to a latest database synchronization event, a reference table comprising a synchronization update identifier, wherein the global update identifier is incremented in response to the latest database synchronization event and the incremented value of the global update identifier is recorded as the synchronization update identifier in response to the latest database synchronization event;

tracking an update to the row, based at least upon determining that the row update identifier is greater than the synchronization update identifier in the reference table; and providing at least a portion of the database subsequent to the update.

10. The non-transitory computer-readable medium as set forth in claim 9, wherein the reference table further comprises a synchronization timestamp recording a date and time the latest database synchronization event occurred.

11. The non-transitory computer-readable medium as set forth in claim 10 further having stored thereon at least one additional instructions comprising executable code which, when executed by the processor, further causes the processor to perform at least one additional step comprising:
adding to the schema of the database table, a second column comprising a row creation timestamp for the row of the database table, wherein the row creation timestamp records a date and time the row was created; and tracking an insertion of the row in the database table, based at least upon comparing the row creation timestamp of the row in the database table to the synchronization timestamp in the reference table.

12. The non-transitory computer-readable medium as set forth in claim 11 further having stored thereon at least one additional instructions comprising executable code which, when executed by the processor, further causes the processor to perform at least one additional step comprising:
adding to the schema of the database table, a third column comprising a unique identifier for the row of the database table;

generating in response to the latest database synchronization event, a lookup table comprising the unique identifier for the row of the database table; and tracking a deletion of the row in a database table, based at least upon determining that the unique identifier of the row in the lookup table is missing from the database table.

13. The non-transitory computer-readable medium as set forth in claim 12, wherein the generating the lookup table comprises updating, in response to the latest database synchronization event, the lookup table.

14. The non-transitory computer-readable medium as set forth in claim 13 further having stored thereon at least one additional instructions comprising executable code which, when executed by the processor, further causes the processor to perform at least one additional step comprising:
removing the unique identifier of the row from the lookup table in response to tracking the deletion.

15. The non-transitory computer-readable medium as set forth in claim 14 further having stored thereon at least one additional instructions comprising executable code which, when executed by the processor, further causes the processor to perform at least one additional step comprising:
    entering the unique identifier of the row into the lookup table in response to tracking the insertion.

16. The non-transitory computer-readable medium as set forth in claim 15, wherein the database is utilized on a mobile device.

17. A database change tracking computing device comprising:
    at least one processor and a memory coupled to the processor which is configured to execute programmed instructions stored in the memory to:
    add to a schema of at least one table of a database, a first column comprising a row update identifier for at least one row of the database table, wherein a global update identifier is incremented in response to a change to the row and the incremented value of the global update identifier is recorded as the row update identifier for the row in response to the change;
    generate in response to a latest database synchronization event, a reference table comprising a synchronization update identifier, wherein the global update identifier is incremented in response to the latest database synchronization event and the incremented value of the global update identifier is recorded as the synchronization update identifier in response to the latest database synchronization event;
    track an update to the row based at least upon determining that the row update identifier is greater than the synchronization update identifier in the reference table; and
    provide at least a portion of the database subsequent to the update.

18. The device as set forth in claim 17, wherein the reference table further comprises a synchronization timestamp recording a date and time the latest database synchronization event occurred.

19. The device as set forth in claim 18, wherein the processor coupled to the memory is further configured to execute at least one additional programmed instruction to:
    add to the schema of the database table, a second column comprising a row creation timestamp for the row of the database table, wherein the row creation timestamp records a date and time the row was created; and
    track an insertion of the row in the database table, based at least upon comparing the row creation timestamp of the row in the database table to the synchronization timestamp in the reference table.

20. The device as set forth in claim 19, wherein the processor coupled to the memory is further configured to execute at least one additional programmed instruction to:
    add to the schema of the database table, a third column comprising a unique identifier for the row of the database table;
    generate in response to the latest database synchronization event, a lookup table comprising the unique identifier for the row of the database table; and
    track a deletion of the row in a database table, based at least upon determining that the unique identifier of the row in the lookup table is missing from the database table.

21. The device as set forth in claim 20, wherein the generate the lookup table comprises updating, in response to the latest database synchronization event, the lookup table.

22. The device as set forth in claim 21, wherein the processor coupled to the memory is further configured to be capable of executing at least one additional programmed instruction to:
    remove the unique identifier of the row from the lookup table in response to tracking the deletion.

23. The device as set forth in claim 22, wherein the processor coupled to the memory is further configured to execute at least one additional programmed instruction to:
    enter the unique identifier of the row into the lookup table in response to tracking the insertion.

24. The device as set forth in claim 23, wherein the database is utilized on a mobile device.

* * * * *